United States Patent
Kung et al.

(10) Patent No.: US 6,310,768 B1
(45) Date of Patent: Oct. 30, 2001

(54) PORTABLE COMPUTER WITH DETACHABLE DISPLAY

(75) Inventors: Shao-Tsu Kung; Chia-Fen Chi, both of Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 09/523,457

(22) Filed: Mar. 10, 2000

(51) Int. Cl.[7] ........................................... H05K 7/14
(52) U.S. Cl. ..................... 361/681; 361/724; 345/905; 312/223.1
(58) Field of Search ................................ 361/681–683, 361/724–727; 345/169, 905; 312/223.1–223.6; 248/917–919

(56) References Cited

U.S. PATENT DOCUMENTS

| | | | |
|---|---|---|---|
| 4,749,364 | * | 6/1988 | Arney et al. ......................... 439/372 |
| 6,163,452 | * | 12/2000 | O'Neal et al. ........................ 361/681 |
| 6,198,625 | * | 3/2001 | Leman ................................. 361/681 |

* cited by examiner

Primary Examiner—Leo P. Picard
Assistant Examiner—Hung Van Duong
(74) Attorney, Agent, or Firm—Pillsbury Winthrop LLP

(57) ABSTRACT

A portable computer includes a main computer module, a liquid crystal display module and a latch unit. The main computer module includes a main housing with a top surface and a first side surface transverse to the top surface. The top surface is formed with an inwardly and longitudinally extending insert groove adjacent to the first side surface. The first side surface is formed with a slot communicated with the insert groove. The liquid crystal display module includes a display housing, a second connector mounted on the display housing and connected electrically and removably to a first connector mounted on the main housing, a pivot retainer having a first pivot portion secured to the display housing, and an anchoring post extending radially from a second pivot portion of the pivot retainer that is coupled rotatably and co-axially to the first pivot portion. The anchoring post is inserted removably into the insert groove from the top surface of the main housing. The latch unit is movably disposed in the insert groove and is accessible via the slot in the main housing so as to be operable for movement between a latching position, where the latch unit engages the anchoring post, and a releasing position, where the latch unit disengages the anchoring post.

9 Claims, 7 Drawing Sheets

PORTABLE COMPUTER WITH DETACHABLE DISPLAY

BACKGROUND OF THE INVENTION

1. Field of the Invention

The invention relates to a portable computer, more particularly to a portable computer with a detachable display module.

2. Description of the Related Art

A conventional portable computer has a display module, and a main computer module connected directly to the display module to form a single unit for outdoor use. However, when the conventional portable computer is used indoors, the relative position between the display module and the main computer module is severely limited due to the single unit configuration, thereby resulting in inconvenience during use. In addition, when the display module is to be replaced with a larger one or when the main computer module is to be upgraded, the entire portable computer may have to be replaced, thereby resulting in unnecessary waste.

SUMMARY OF THE INVENTION

Therefore, the main object of the present invention is to provide a portable computer that has a detachable display module so as to facilitate replacement.

Another object of the present invention is to provide a computer display assembly that can be easily connected to a main computer module of a desktop computer or a portable computer so as to result in increased convenience.

According to one aspect of the present invention, a portable computer includes a main computer module, a liquid crystal display module and a latch unit.

The main computer module includes a main housing with a top surface and a first side surface transverse to the top surface. The top surface is formed with an inwardly and longitudinally extending insert groove adjacent to the first side surface. The first side surface is formed with a slot communicated with the insert groove. The main computer module further includes a first connector mounted on the main housing.

The liquid crystal display module includes a display housing, a second connector, a pivot retainer and an anchoring post. The second connector is mounted on the display housing, and is connected electrically and removably to the first connector. The pivot retainer has a first pivot portion secured to the display housing, and a second pivot portion coupled rotatably and co-axially to the first pivot portion. The anchoring post extends radially from the second pivot portion. The anchoring post is inserted removably into the insert groove from the top surface of the main housing, thereby coupling rotatably the display housing to the main housing.

The latch unit is movably disposed in the insert groove and is accessible via the slot in the main housing so as to be operable for movement between a latching position, where the latch unit engages the anchoring post to prevent removal of the anchoring post from the insert groove, and a releasing position, where the latch unit disengages the anchoring post to permit removal of the anchoring post from the insert groove.

According to another aspect of the present invention, a computer display assembly is adapted for use with a main computer module, and includes a display stand and a liquid crystal display module.

The display stand includes a stand housing formed with an insert groove, and first and second connectors mounted on the stand housing. The first connector is adapted to be connected electrically to the main computer module.

The liquid crystal display module includes a display housing, a third connector, a pivot retainer and an anchoring post. The third connector is mounted on the display housing, and is connected electrically and removably to the second connector. The pivot retainer has a first pivot portion secured to the display housing, and a second pivot portion coupled rotatably and co-axially to the first pivot portion. The anchoring post extends radially from the second pivot portion, and is inserted removably into the insert groove.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
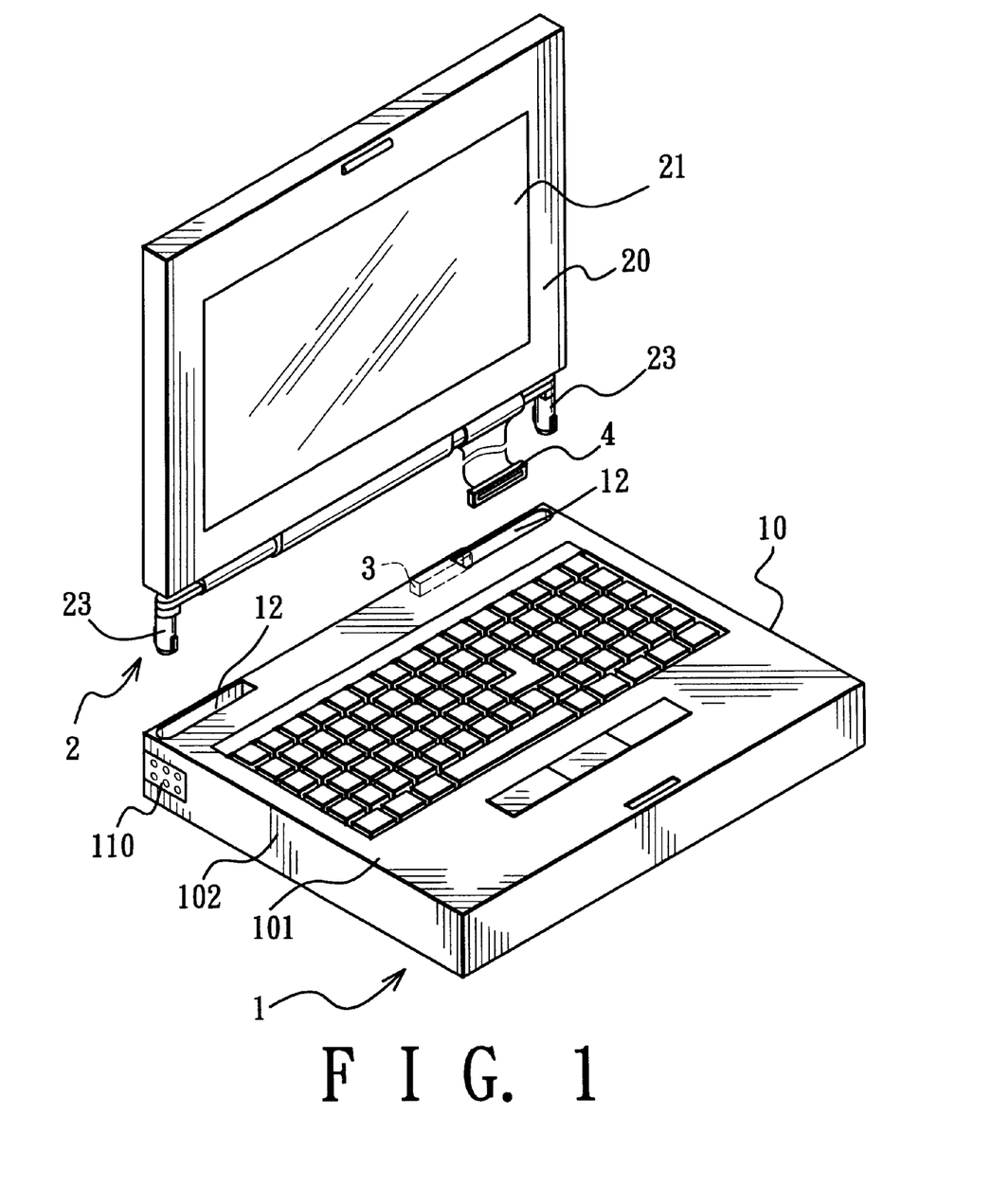
FIG. 1 is an exploded perspective view of the preferred embodiment of a portable computer according to this invention.
Figure 2:
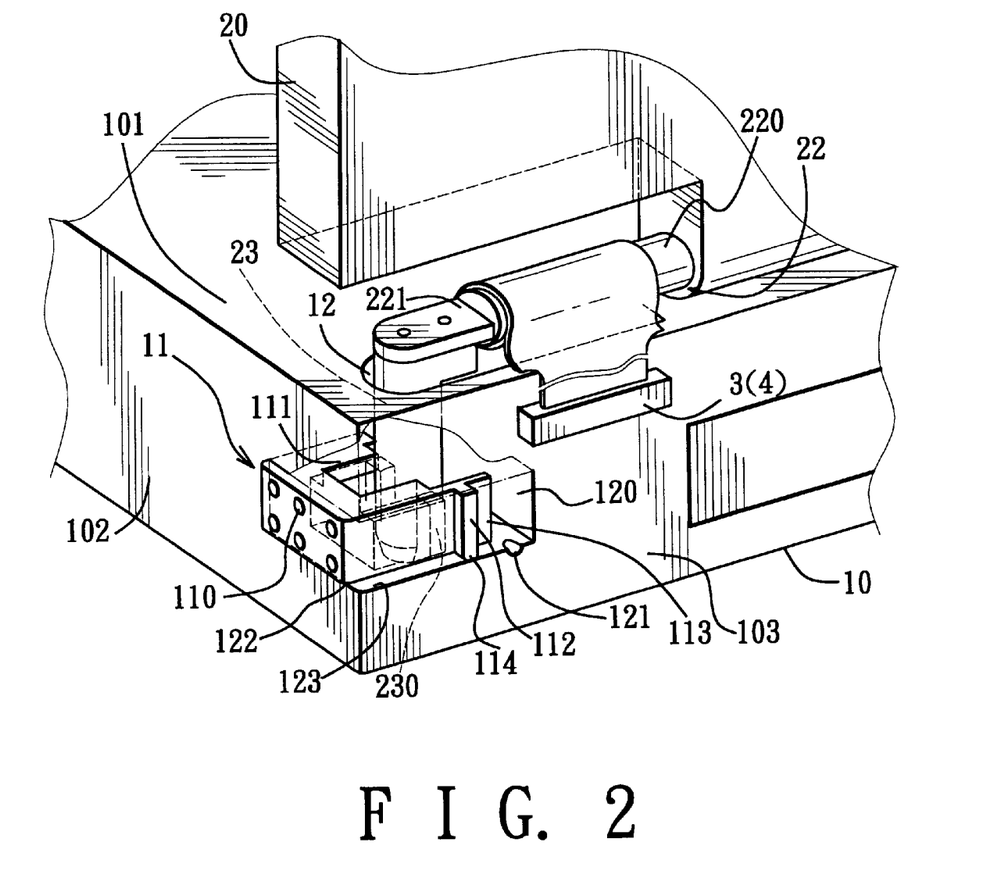
FIG. 2 is a fragmentary perspective view of the preferred embodiment.

Referring to FIGS. 1 and 2, according to the preferred embodiment of this invention, a portable computer is shown to include a main computer module 1, a liquid crystal display module 2 and a pair of latch units 11.

The main computer module 1 includes a main housing 10 with a top surface 101, a first side surface 103 transverse to the top surface 101, and opposite second side surfaces 102 transverse to the first side surface 103 and the top surface 101. The top surface 101 is formed with a pair of inwardly and longitudinally extending insert grooves 12 adjacent to the first side surface 103 and a respective one of the second side surfaces 102. The first side surface 103 is formed with a pair of slots 120, each of which is communicated with a respective one of the insert grooves 12. The second side surfaces 102 are formed with a respective opening 122 communicated with the adjacent insert groove 12. The main computer module 1 further includes a first connector 3 mounted on the first side surface 103 of the main housing 10.

The liquid crystal display module 2 includes a display housing 20, a second connector 4, a pair of pivot retainers 22 and a pair of anchoring posts 23. The display housing 20 receives a liquid crystal display panel 21 therein. The second connector 4 is mounted on the display housing 20, and is connected electrically and removably to the first connector 3. Each of the pivot retainers 22 has a first pivot portion 220 secured to the display housing 20, and a second pivot portion 221 coupled rotatably and co-axially to the first pivot portion 220. Each of the anchoring posts 23 extends radially from the second pivot portion 221 of a respective one of the pivot retainers 22, and is inserted removably into a respective one of the insert grooves 12 from the top surface 101 of the main housing 10, thereby coupling rotatably the display housing 20 to the main housing 10. Each of the anchoring posts 23 is formed with opposite radial lugs 230.

Figure 3:
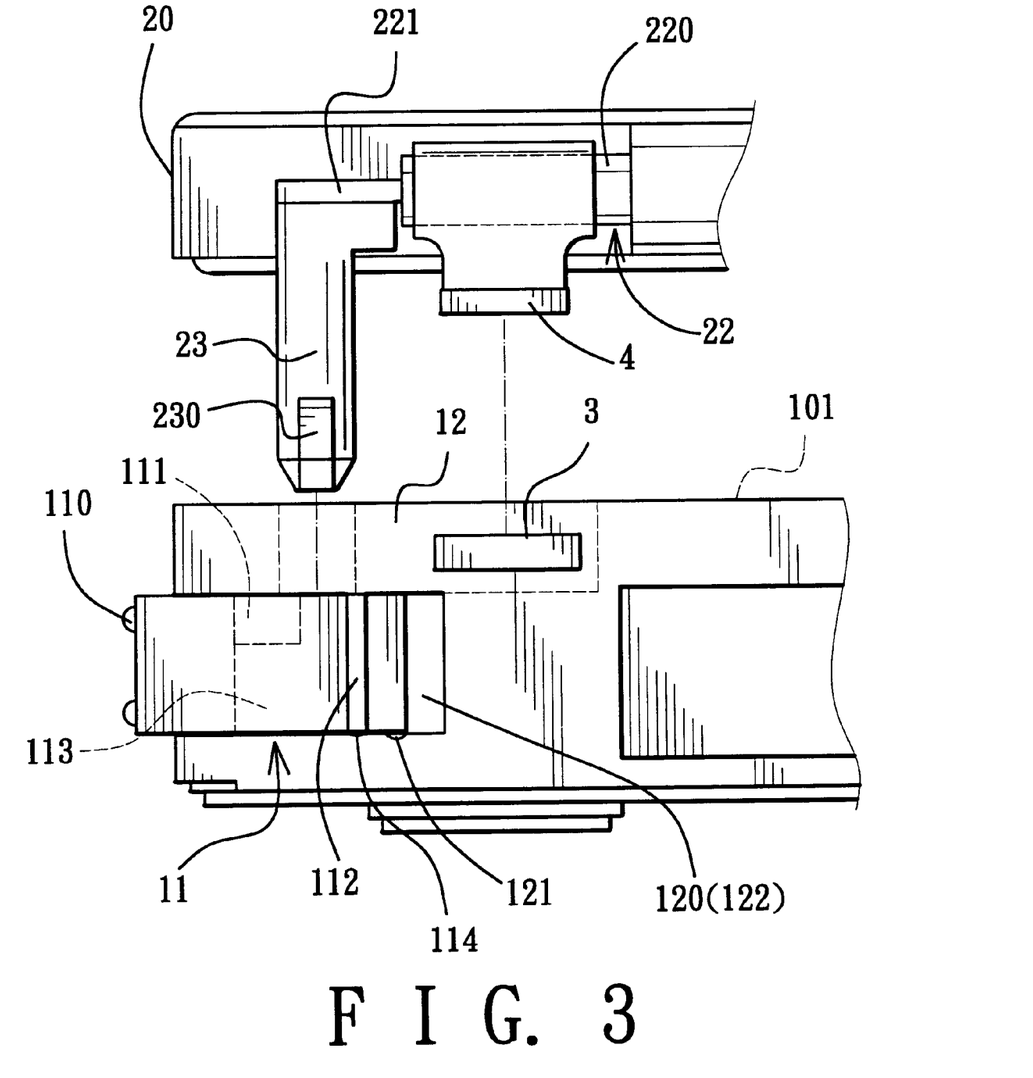
FIG. 3 is a fragmentary exploded schematic side view of the preferred embodiment when a latch unit thereof is in a releasing position.
Figure 4:
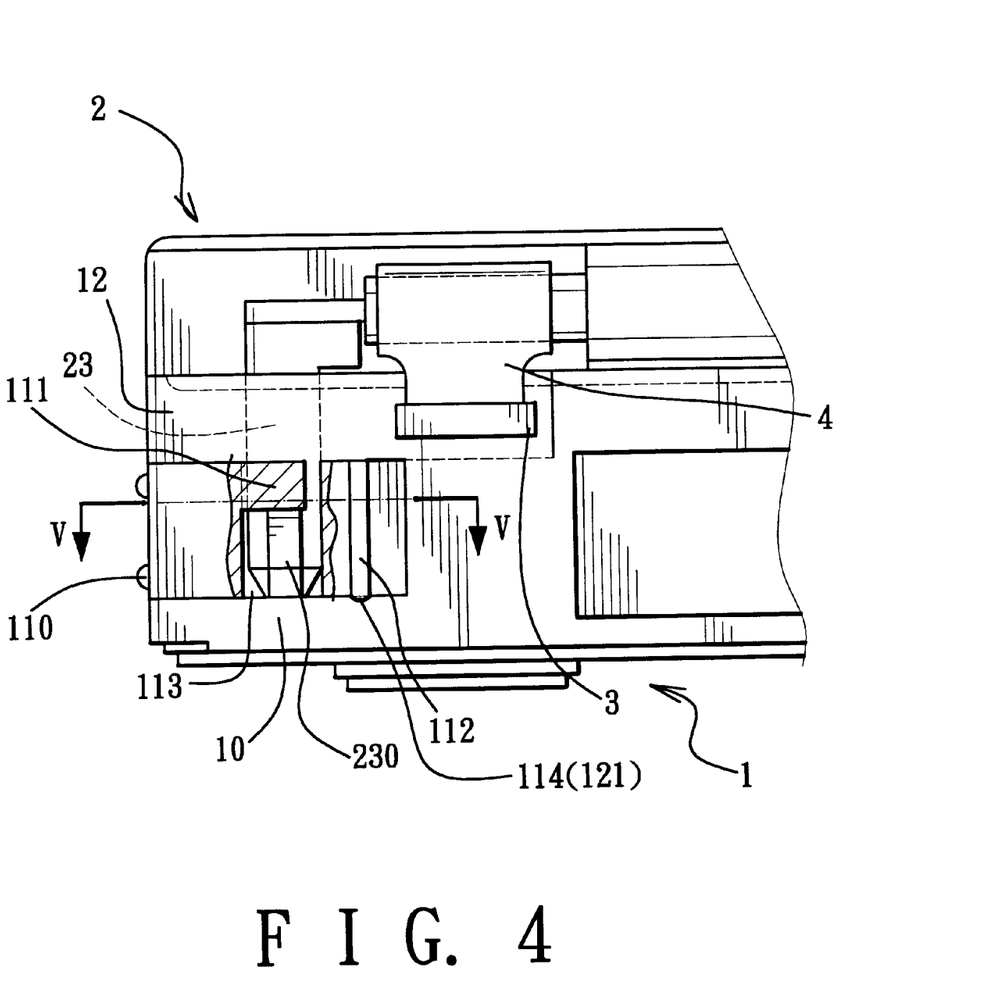
FIG. 4 is a fragmentary schematic side view of the preferred embodiment when the latch unit is in a latching position.
Figure 5:
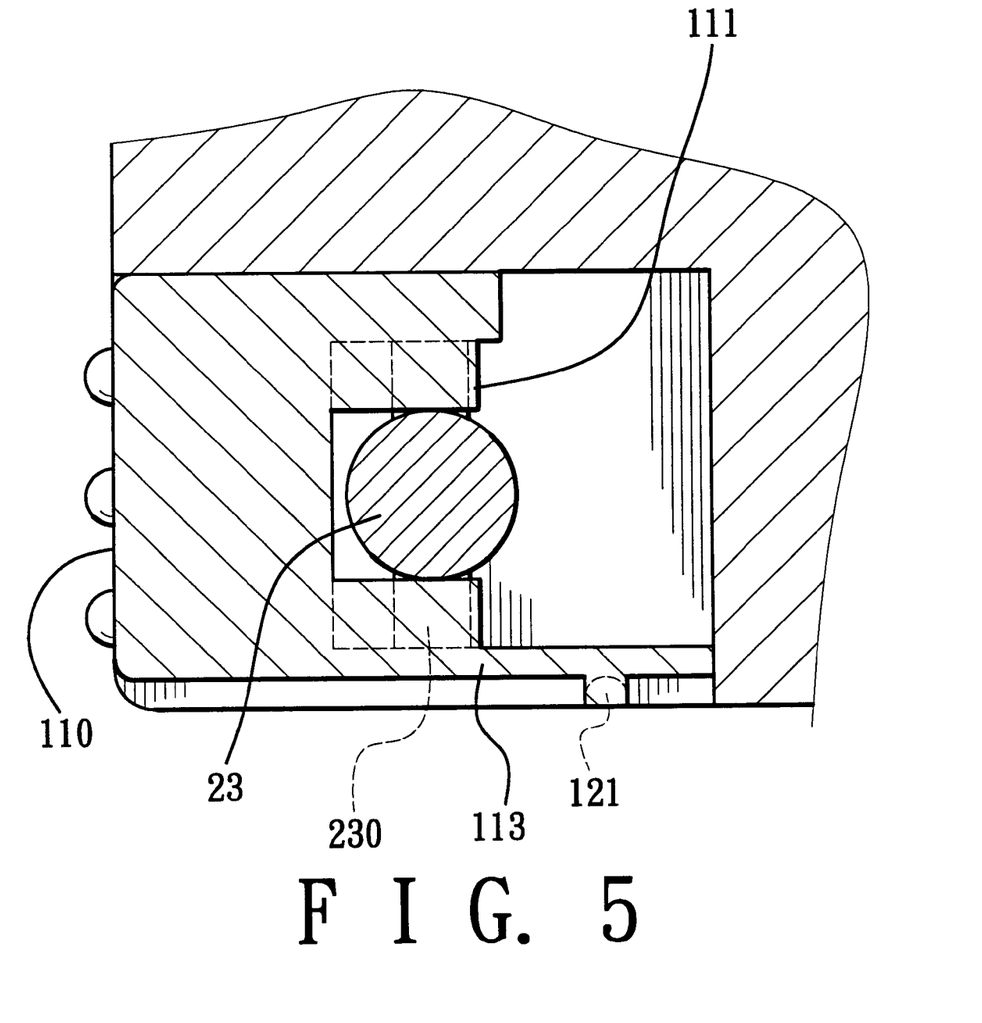
FIG. 5 is a fragmentary sectional schematic view of FIG. 4 taken along line V—V.

With further reference to FIGS. 3 and 4, each of the latch units 11 is movably disposed in a respective one of the insert grooves 12, and is accessible via the respective slot 120 so as to be operable for movement between a latching position, where the latch unit 11 engages the inserted anchoring post 23 to prevent removal of the anchoring post 23 from the insert groove 12, and a releasing position, where the latch unit 11 disengages the inserted anchoring post 23 to permit removal of the anchoring post 23 from the insert groove 12. Each of latch units 11 includes a U-shaped engaging portion 111 parallel to the top surface 101 of the main housing 10, an operating portion 113 parallel to and adjacent to the first side surface 103 of the main housing 10, and a push portion 110 parallel to and adjacent to one of the first side surfaces 102 of the main housing 10. The engaging portion 111 is disposed above the radial lugs 230 to engage the radial lugs 230, respectively, when the latch unit 11 is in the latching position, as shown in FIGS. 4 and 5, and is spaced apart from the radial lugs 230 to disengage the radial lugs 230 when the latch unit 11 is in the releasing position, as shown in FIG. 3. The operating portion 113 is transverse to the engaging portion 111 and is accessible via the slot 120 in the main housing 10. The operating portion 113 is formed with an operating knob 112 to facilitate movement of the latch unit 11 between the latching and releasing positions. The push portion 110 is transverse to the engaging portion 111 and the operating portion 113 and is accessible via the opening 122. The push portion 110 is depressible to facilitate movement of the latch unit 11 from the releasing position to the latching position.

The portable computer further includes positioning means for retaining releasably the latch units 11 in the latching position. The positioning means includes a stub 114 formed on a bottom side of each of the operating knobs 112, and a groove 121 formed in the main housing 10 on a bottom wall 123 of each of the insert grooves 12 to engage removably the stub 114.

Figure 6:
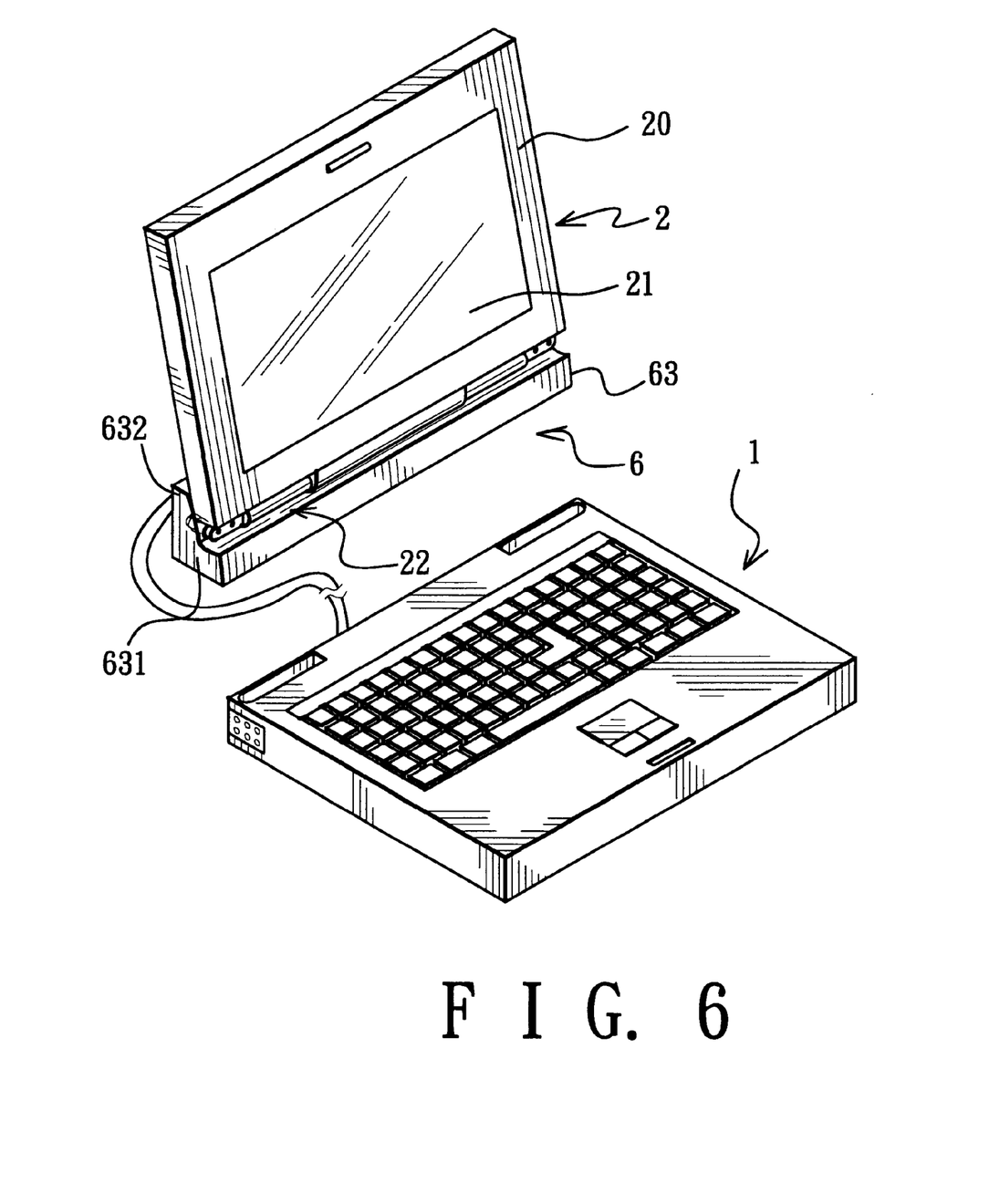
FIG. 6 is a perspective view of the preferred embodiment when the liquid crystal display module is connected electrically to the main computer module via a display stand.
Figure 7:
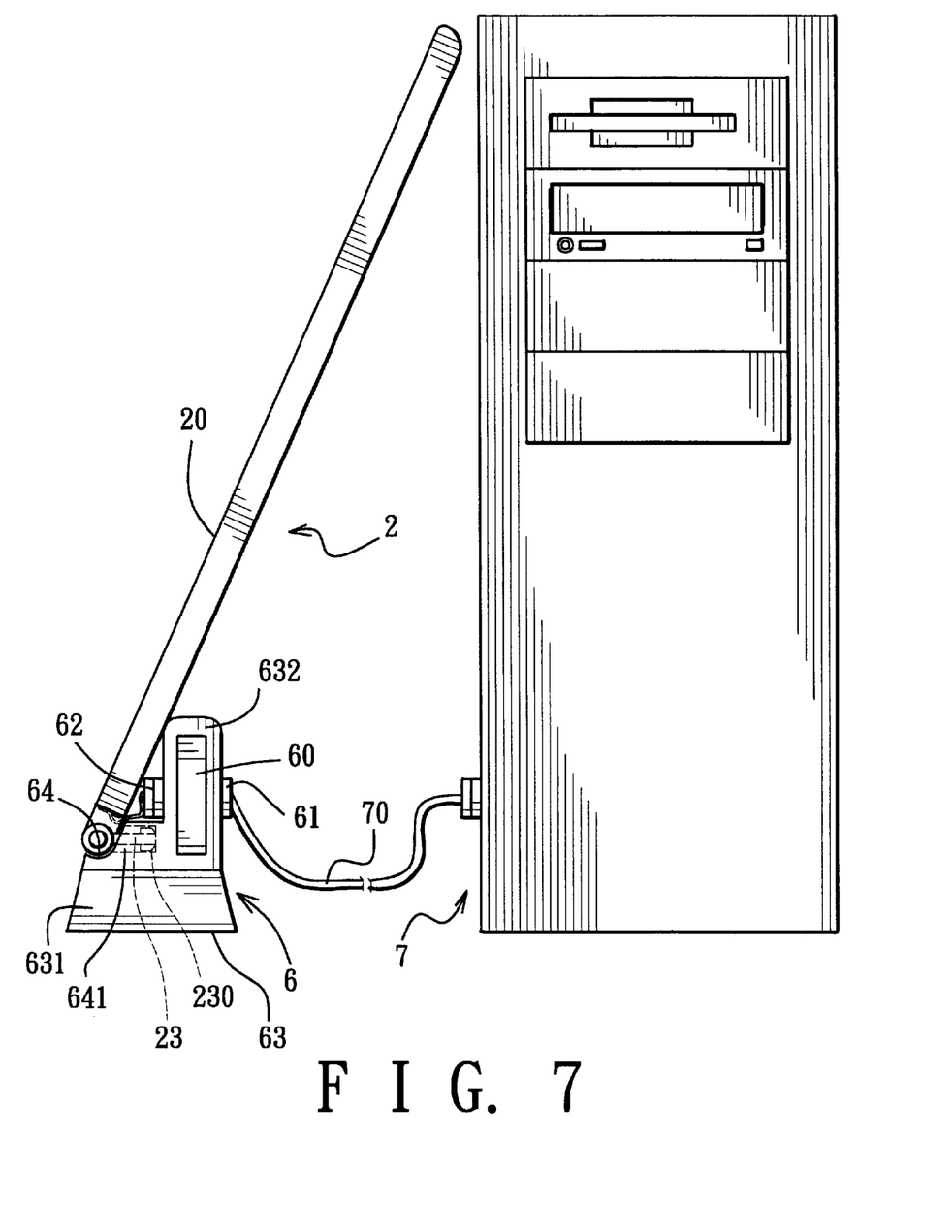
FIG. 7 is a schematic side view of the liquid crystal display module of the preferred embodiment when connected electrically to a main computer module of a desktop computer.

Referring to FIGS. 6 and 7, when the liquid crystal display module 2 is detached from the main computer module 1, a display stand 6 provided for supporting the liquid crystal display module 2 and for interconnecting electrically the liquid crystal display module 2 and the main computer module 1 or a main computer module 7 of a desktop computer. The liquid crystal display module 2 can thus be placed at a desired location and orientation for increased convenience. The display stand 6 includes a stand housing 63, and third and fourth connectors 61, 62 (not visible in FIG. 6). The stand housing 63 includes a base portion 631 adapted to be placed on a table surface, and an upright portion 632 that extends uprightly from the base portion 631 and that has a front surface 64 formed with a pair of insert grooves 641 for receiving the anchoring posts 23 of the liquid crystal display module 2. The display housing 20 is seated on the base portion 631 and leans against the upright portion 632 when the liquid crystal display module 2 is disposed on the display stand 6.

As shown in FIG. 7, the third and fourth connectors 61, 62 are mounted on the upright portion 632 of the stand housing 63. The third connector 61 is adapted to be connected electrically to the main computer module 7 via a cable 70. The fourth connector 62 is connected electrically and removably to the second connector 4 on the display housing 20 of the liquid crystal display module 2. When the liquid crystal display module 2 on the display stand 6 is to be connected to the main computer module 7, the display stand 6 can further include a video interface device 6, such as a VGA card, disposed inside the stand housing 63 and interconnecting electrically the third and fourth connectors 61, 62.

It is noted that the portable computer of this invention can be easily upgraded by simply replacing the detachable liquid crystal display module 2 with another liquid crystal display module of a larger size. The liquid crystal display module 2 can also be used as a display module of the desktop computer so as to result in increased convenience. The objects of the invention are thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A portable computer comprising:
    a main computer module including a main housing with a top surface and a first side surface transverse to said top surface, said top surface being formed with an inwardly and longitudinally extending insert groove adjacent to said first side surface, said first side surface being formed with a slot communicated with said insert groove, said main computer module further including a first connector mounted on said main housing;
    a liquid crystal display module including
        a display housing,
        a second connector mounted on said display housing and connected electrically and removably to said first connector,
        a pivot retainer having a first pivot portion secured to said display housing, and a second pivot portion coupled rotatably and co-axially to said first pivot portion, and
        an anchoring post extending radially from said second pivot portion, said anchoring post being inserted removably into said insert groove from said top surface of said main housing, thereby coupling rotatably said display housing to said main housing; and
    a latch unit movably disposed in said insert groove and accessible via said slot in said main housing so as to be operable for movement between a latching position, where said latch unit engages said anchoring post to prevent removal of said anchoring post from said insert groove, and a releasing position, where said latch unit disengages said anchoring post to permit removal of said anchoring post from said insert groove.

2. The portable computer of claim 1, wherein said anchoring post is formed with a radial lug, said latch unit having an engaging portion to engage said radial lug when said latch unit is in the latching position, and to disengage said radial lug when said latch unit is in the releasing position.

3. The portable computer of claim 2, wherein said latch unit further has an operating portion transverse to said engaging portion and accessible via said slot in said main housing, said operating portion being formed with an operating knob to facilitate movement of said latch unit between the latching and releasing positions.

4. The portable computer of claim 3, wherein said main housing further has a second side surface transverse to said first side surface and said top surface, said second side surface being formed with an opening communicated with said insert groove, said latch unit further having a push portion transverse to said engaging portion and said operating portion and accessible via said opening, said push portion being depressible to facilitate movement of said latch unit from the releasing position to the latching position.

5. The portable computer of claim 1, further comprising positioning means for retaining releasably said latch unit in the latching position.

6. The portable computer of claim 5, wherein said positioning means includes a stub formed on one of said latch unit and said main housing, and a groove formed in the other one of said latch unit and said main housing to engage removably said stub.

7. A computer display assembly adapted for use with a main computer module, comprising:

a display stand including a stand housing formed with an insert groove, and first and second connectors mounted on said stand housing, said first connector being adapted to be connected electrically to the main computer module; and a liquid crystal display module including
 a display housing,
 a third connector mounted on said display housing and connected electrically and removably to said second connector,
 a pivot retainer having a first pivot portion secured to said display housing, and a second pivot portion coupled rotatably and co-axially to said first pivot portion, and
 an anchoring post extending radially from said second pivot portion, said anchoring post being inserted removably into said insert groove.

8. The computer display assembly of claim 7, wherein said stand housing includes a base portion adapted to be placed on a table surface, and an upright portion that extends uprightly from said base portion and that has a front surface formed with said insert groove, said display housing being seated on said base portion and leaning against said upright portion when said liquid crystal display module is disposed on said display stand.

9. The liquid crystal display module of claim 7, further comprising a video interface device disposed inside said stand housing and interconnecting electrically said first and second connectors.

* * * * *